(12) United States Patent
Meier et al.

(10) Patent No.: US 7,365,877 B2
(45) Date of Patent: Apr. 29, 2008

(54) OPTIMIZATION OF IMAGE DATA BY COLOR MANAGEMENT

(75) Inventors: Roland Meier, Aarau (CH); Erwin Heimgartner, Baden (CH); Peter Zolliker, Dielsdorf (CH)

(73) Assignee: Imaging Solutions A.G., Regensdorf (CH)

( * ) Notice: Subject to any disclaimer, the term of this patent is extended or adjusted under 35 U.S.C. 154(b) by 939 days.

(21) Appl. No.: 10/622,116

(22) Filed: Jul. 18, 2003

(65) Prior Publication Data
US 2004/0086176 A1    May 6, 2004

(30) Foreign Application Priority Data
Jul. 19, 2002    (EP)    .................................. 02016231

(51) Int. Cl.
H04N 1/46    (2006.01)
G06K 9/00    (2006.01)

(52) U.S. Cl. ...................... 358/1.9; 358/504; 358/518; 382/162

(58) Field of Classification Search ................ 382/162, 382/176; 358/504, 518, 520, 1.9
See application file for complete search history.

(56) References Cited

U.S. PATENT DOCUMENTS 5,696,839 A * 12/1997 Siegeritz ...................... 382/162
2002/0131770 A1    9/2002 Meier et al.

FOREIGN PATENT DOCUMENTS

EP    1 227 659 A1    1/2001
WO    WO00/07035    2/2000

OTHER PUBLICATIONS

The Creation of the sRGB ICC Profile by Mary Nielson and Michael Stokes, Hewlett-Packard Company, Boise, Idaho, U.S.A., in Color Research Nr. 568, pp. 253-257, 1998.
Appendix A: Colorimetry in "Digital Color Management" of E.J. Giorgianni & T. E. Maddon, Addison-Wesley, Massachusetts, 1997, pp. 440-445, (ISBN 0-201-63426-0).
Color Management: Current Practice and the Adoption of a New Standard by Michael Has and Todd Newman which is available at the internet address http://www.color.org/wpaper1.html.
Kang, H.R. (1997a), 2.6 Kubelka-Mulk Theory, in: Color Technology for Electronic Imaging Devices, SPIE Optical Engineering Press (Washington, U.S.A.), pp. 48-54.
Beretta G. B.: Method For Estimating Color Gamut Mapping On A Display Device—Xerox Disclosure Journal, Xerox Corporation, Stamford, Conn. Bc. 17, Nr. 3, May 1, 1992 XP000271722.

* cited by examiner

Primary Examiner—Thomas D. Lee
(74) Attorney, Agent, or Firm—Buchanan Ingersoll & Rooney PC

(57) ABSTRACT

Process for the processing of image data which represent the color values of an image, to achieve optimal color reproduction of the image by an image reproduction system, especially by a photographic printer or photolab in response to the image data. In an exemplary embodiment, the image data which represent first positions in a first color space are received. The first positions are transformed into transformation positions which represent positions in a second color space; and the response of the image reproduction system to the image data is modeled with a model image reproduction system such that the model image reproduction system outputs the response as model positions which represent the color values produced by the model image reproductions system in response to the input of the image data as positions in a second color space. Second positions in the second color space can be determined based on the transformation positions and the model positions to determine optimized image data for the control of the image reproduction system.

13 Claims, 3 Drawing Sheets

Fig. 2 Modeling Process

OPTIMIZATION OF IMAGE DATA BY COLOR MANAGEMENT

RELATED APPLICATIONS

This application claims priority under 35 U.S.C. §119 to a European Application 02 016 231.9 filed in Europe on 19 Jul. 2002, the entire contents of which are hereby incorporated by reference in their entirety.

FIELD

Exemplary embodiments relate to the processing of image data to achieve a most optimal color reproduction. In particular, embodiments relate to the field of photography, which means the image data represent especially photographic images, as obtained by photographic cameras, video cameras, digital cameras, etc. The image data are used for the control of image reproduction systems, for example photographic printers, photolabs, minilabs, monitors (liquid crystal displays and CRT monitors), and so on. Exemplary embodiments can improve the color impression of images which are reproduced by the image reproduction system, for example on a medium (paper, photographic paper, foil, etc.) or a screen (monitor). Exemplary embodiments can watch the color space (input gamut) which can be captured by an input device (for example scanner, digital camera, etc.) with the color space (output gamut) reproduced by the image reproduction system at the output side, when the input gamut does not match with the output gamut. Exemplary embodiments can process image data which were captured by an input device and are present in a device dependent color space, so that they can be output as optimally as possible by an image reproduction system, which also defines a device dependent color space.

BACKGROUND

An example for the above described field of use is the processing of sRGB image data, which are output, for example, by a digital camera and which are processed by an image reproduction system (for example photographic printer or minilab) in such a way that the image which is represented by the image data is produced, for example, by way of a photographic paper.

The sRGB color space and its connection, for example, with the XYZ color space is described, for example, in "The Creation of the sRGB ICC Profile" by Mary Nielson and Michael Stokes, Hewlett-Packard Company, Boise, Id., U.S.A., in Color Research Nr. 568, pages 253-257, 1998. The sRGB color space can be especially popular for the following reasons:

(a) the transfer function and chromaticity of the primary phosphorous colors of cathode ray tubes (CRT monitors) are very similar to the sRGB color space. Thus, images can be shown at reasonable quality on monitors without the need to additionally map the colors by way of a profile. The sRGB color space is by now so common that even in technology fields with transfer functions that strongly deviate from sRGB, for example LCD monitors or plasma monitors, they still support the image data input through an sRGB interface.

b) the manufacturers of digital scanners, monitors and digital cameras often provide as a further feature of their devices that they output RGB image data.

c) almost all computer programs which are conventionally available support sRGB similar color spaces.

Unfortunately, the sRGB color space and the color space of photographic paper (for example silver halogenide paper) are significantly different (see FIG. 3). Wide regions of the sRGB color space, especially the bright, saturated colors, lie outside the gamut of the photographic paper. Conversely, a monitor normally fails to reproduce the darker, saturated colors of the photographic paper.

In order to adapt the range of the colors (input gamut) which can be captured by the input device to the range of the colors (output gamut) which can be reproduced by the image reproduction system, the following two processes are currently used:

(1) The sRGB data are simply used as image control data to control the image reproduction system. In other words, the sRGB coordinates are interpreted and used as RGB coordinates for the control of a printer by way of its RGB input. This process is extremely simple and guarantees that all printable colors of the printer can be exploited (when the range of values of the sRGB coordinates matches the range of values of the RGB coordinates).

(2) The classical color management approach is used. With respect to color management, reference is made to "Appendix A: Colorimetry" in "Digital Color Management" of E. J. Giorgianni & T. E. Maddon, Addison-Wesley, Massachusetts, 1997, pp. 440-445, (ISBN 0-201-63426-0). The principle of a device independent platform which represents a central point of the color management, is also described in the article "Color Management: Current Practice and the Adoption of a New Standard" by Michael Has and Todd Newman which is available at the internet address http://www-.color.org/wpaper1.html. According to the classical color management approach, the input sRGB coordinates are transformed into color coordinates of a color space platform (in the following abbreviated as PCS for "profile connection space"). The color space platform is preferably a device independent color space. Thus, the gamut of the color space platform preferably encompasses all possible or actually present gamuts of the input devices and output devices. An image with a given gamut in the color space platform (PCS) is mapped onto the nominal color space and then converted into RGB device coordinates of the output device (image reproduction device).

Besides the above mentioned processes, the following process are also possible:

(3) One starts with a preselected color pallet or test scenery. One captures the color pallet or test scenery both by way of a conventional photographic apparatus with film as well as with a digital image capturing system (for example digital camera or scanner). The data are then processed, whereby analog techniques are used in the conventional photography and digital processes are used in the digital image capturing. The two results are compared and a profile is produced in order to change the digitally captured data until a printout based on the digital data corresponds to the printout of the analog system (conventional photography).

However, each of the above mentioned processes has its weakness:

(1) Process 1 violates the principles of the color management. It is one of the essential principles of color management to achieve a color perception which comes as close as possible to the color perception of the original image. However, strong shifts and distortions occur between the sRGB color space and the printer color space. They are mutually rotated and twisted. However, the process 1 simply maps corners onto corners of the respective color space. The hue, saturation and brightness are thereby not at all maintained during the mapping. This leads to a color reproduction which has very little in common with the color impression of the original image. It is a direct cause of this solution, as the inventors have recognized, that the color properties of the photographic paper are recognizable. For example, the greenish yellow of a lemon, which corresponds to the yellow corner of the sRGB color space, becomes orange on the photographic paper. In similar manner, the bright monitor green is reproduced as a dark green on the photographic paper. In summary, this process has little in common with standard color management principles. The user is left alone with the actual color management. He must manually preprocess the data before the input into the printer in order to achieve the desired colors.

The sRGB color space includes many highly saturated, very bright colors, which cannot be reproduced with a photographic paper. The inventors have recognized that standard color management programs according to the above process number 2 must find a compromise between the preservation of the hue, the saturation and the brightness. These bright, strongly saturated colors are thereby mapped onto very bright pastel colors. Although this is mathematically correct, this is often not the color which an observer would expect. This applies especially for graphics or colored text. When large regions of the sRGB color space are outside the portion of the color space reproducible by the paper, which means outside the color gamut of the photographic paper, wide regions of the sRGB gamut are compressed onto a small region when after the mapping of the sRGB gamut into the color space platform (PCS) the unavoidable gamut compression takes place upon the gamut mapping into the color space of the output device (image reproduction system or printer). This compression of significant portions of the sRGB gamut leads to a loss in contours, especially for bright, highly saturated colors. On the other hand, the sRGB gamut, which means the color space stretchable by the sRGB data, covers only a portion of the photographic paper gamut, which means the colors reproducible by the photographic paper, namely in the range of the dark colors. These dark colors do not occur in the sRGB color space of the input device and are therefore never used for a printout in the process according to point number 2. In other words, a significant portion of the available photographic paper gamut or printer gamut is not used.

The inventors have, for example, discovered that the third process provides better color reproduction results than the processes 1 and 2, namely in the case of the reproduction of digital image data (which, for example, are stored on a digital medium) on a photographic paper. The process 3 can however, be hard to generalize and can be inflexible. The process 3 requires the use of a concrete photographic paper and a concrete color chart. It is thereby assumed that the specifically used photographic paper is a generally valid reference paper and that the colors reproduced on the color chart cover all possible colors. However, at least each concrete photographic paper has its advantages and disadvantages and, thus, is not optimal. Since the process is based on measurements, the color transformation cannot be parameterized and thereby adapted to other cases, especially to other photographic papers. The reason for that is especially that the color transformation has black box properties.

SUMMARY OF THE INVENTION

Exemplary embodiments provide a process for the processing of image data originating from an input device in such a way that they can be flexibly adapted with respect to a most optimal color reproduction by an output device. Furthermore, a corresponding program and a computer storage medium or computer with the program is to be created as well as a photographic printer or photolab in which the process is used.

Image data can be processed which represent first positions in a first color space, for example sRGB, CIEXYZ, CIELAB, and so on. For example, sRGB image data can be used. The first positions are then subjected to a transformation as well as entered into a model. It is arbitrary whether the entry into the model is first carried out or the transformation and both can also be carried out in parallel or simultaneously.

The first positions are transformed by the transformation into so called transformation positions. The color values represented by the image data can be thereby maintained unchanged or with only little change. The transformation positions represent positions in a second color space, which is, for example, CIELAB, CIEXYZ, or sRGB. The second color space can be different from the first color space, especially when the first color space is device dependent and the second color space is preferably a device independent color space, for example CIELAB or CIEXYZ. The transformation can be carried out according to a preselected mathematical rule, such as an analytical rule. A transformation based on lookup tables (LUTs) can also be used.

The transformation can be carried out in such a way that all first positions represented by the image data in the first color space are transformed onto a transformation position in the second color space. The possible first positions can stretch the same color space (gamut) as the possible transformation positions resulting from the transformation of the possible first positions. The transformation can be reversible or bijective. Each color value (or at least a majority of the color values) which is represented by a first position in the first color space can correspond at least approximately, for example, under the assumption of certain observation conditions, such as, for example, the opening angle and the spectral distribution of the illumination, to that color value which is represented by the corresponding transformation position.

The second color space can be such that it is more similar to the color space of the output device (for example an image reproduction system) than the first color space. A larger similarity means in particular that more color values of the output device are representable in the second color space than in the first color space in that the range of the colors not reproducible with the output device is maintained as small as possible. All color values of the output device can be reproducible in the second color space.

The gamut of the second color space (preference color gamut) can be at least similar to the output color gamut or to a union set of predetermined output color gamuts. Similarity hereby means that the gamuts are the more similar the smaller the resulting differential set. The differential set can be determined, for example, as volume difference between the two compared gamuts. The volume difference can thereby be determined, for example by way of CIELAB coordinates. The volume difference between the reference gamut and the output gamut or the union set of the predetermined output gamuts can be smaller than 30%, 10%, 5% or 1% of the volume of the reference gamut.

A transformation can be used for the transformation between the first color space (for example sRGB) to the second color space (for example Lab) for which an analytical solution exists.

The image data are not only transformed into transformation positions, but also can be fed to a model image production system in order to so obtain model positions. The model positions can describe positions in the same second color space as in the above mentioned. A model image reproduction system is disclosed in the European Patent Application No. 01 101 128.5-2202, the corresponding U.S. patent application Ser. No. 10/053,629 and the corresponding Canadian Patent Application No. 2,367,928 and the corresponding Japanese Patent Application No. 2002-012152. The teachings of these patent applications are specifically incorporated into the description of the present patent application. For example, the image data can be subjected to the following process for the modeling of an image reproduction system, in order to obtain the model positions:

It is thereby a process for the modeling of images which are reproduced by light modulators which corresponding to light modulation values, spectrally modulate the intensity of the incoming light whereby a model image reproduction system determines the light modulation values of the light modulators in response to image control data (image data), whereby the process includes the followings:

the light modulation values of the light modulators used for the image reproduction are calculated based on the input image control data (image data) by modeling of the response of the model image reproduction system to the input image control data (image data), and/or modulation color values which describe the color values of the image reproduced by the light modulators which results upon light impinging on the light modulators, are calculated based on the calculated light modulation values.

In order to convert the image data into model positions with the above mentioned processes, the image data are input into the process as image control data. For example, when the model image production system includes, for example, an input for image control data, for example in RGB format, and if the image control data are present, for example in sRGB format, the sRGB data are interpreted by the model image reproduction system as RGB data. Furthermore, the model positions correspond to those positions in the second color space which describe the modulation color values.

The above mentioned modeling process relates especially to the modeling of photographic images which are reproduced in the form of light modulators. Light modulators are, for example, pigments or interference filters, whereby the light permeability is controllable of the interference filters is controllable, for example, with liquid crystals. Light modulators modulate or change the intensity of the incoming light and modulate or change the spectrum of the incoming light. Light modulators reflect, absorb and/or transmit the incoming light, whereby the incoming light is reflected, absorbed and/or transmitted depending on the wavelength. Absorption, reflection as well as transmission properties are generally wavelength dependent.

An exemplary modeling process used relates to a process for the modeling how an image appears to an observer or a measurement device with several defined color channels, whereby the image is produced by an image reproduction system that produces the image by way of light modulators and that is controlled by preselected image data (image control data). The image data can thereby directly control the light modulators (for example the elements of an LCD display) or indirectly cause the generation of light modulators (for example the generation of pigment by the control of an exposure unit with the image data, whereby the exposure unit exposes photographic paper; or the spraying of colored ink onto paper).

With the modeling process, especially image reproducing systems can be modeled which include an image reproducing device (for example printer) and a medium (for example paper) whereby the image reproducing device produces especially the light modulators in the medium (for example photographic paper exposure) or thereon (for example inkjet printing or color laser printing). The medium can thereby be reflective and/or transmissive (for example foil) and the image can thereby be absorbed in reflection or transmission.

The modeling process also relates to the modeling of image reproducing systems in which the light modulators are not produced but already at the beginning have their light modulation properties and are arranged for the image reproduction, as is the case, for example, with a field of interference filters coupled with light intensity modulators (for example liquid crystals or LCD display).

The modeling process relates especially to the color modeling of a photographic image reproduced on a medium (for example photographic paper or normal paper printed with color) by way of pigment and especially the use of the model in a process, which determines the color values of the photographic image on the basis of preselected image data (image control data) which describe the color values of the light reflected, transmitted and/or absorbed by the image, when the image is reproduced by the image reproduction system. The image data serve the control of the image reproduction device which produces an image on an image medium (for example photographic paper) by way of pigments. The color values describe especially the colors of the image perceived by a (standard) human, whereby the image is observed, for example, in reflection or transmission. By way of the color values, spectra are represented by discreet values. Conventionally, three values are used corresponding to the human eye. The color values can be obtained from the spectra by folding with functions which, for example, represent the sensitivity curves of the human eye. However, they can also be obtained by folding with other functions such as, for example, during the generation of an ANSI-A color values. The functions used thereby are of a narrower band than the sensitivity curves of the human eye and correspond especially to the sensitivity curves of a color density measurement device.

Exemplary embodiments relate to printers, especially photolabs. In particular, minilabs, but also large scale labs and devices for large scale labs can use the process described herein. Exemplary embodiments also relate to the field of photography and the processing of photographic image data. The image data can be two-dimensional as is conventional, but can also be three-dimensional as is the case, for example, with holograms.

The photolabs or printers can receive data in multiple different ways, for example through different input channels, and distribute them especially over different output channels. The input devices can receive as data carriers, for example, diskettes, CD's, DVD's, memory sticks, memory cards, hard drives, and so on. Of course, they can also include scanners, in particular for the scanning of conventional films in order to obtain the image data. Especially printers or exposure devices which, for example, operate with DMDs (Digital Mirror Device) or inkjet printers, can serve as output devices. The processed image data can also be output digitally, for example, through the Internet, or stored on a data carrier, for example a CD or DVD (see FIG. 1).

As already mentioned above, a color space platform or a profile connection space (PCS) can be used as second color space. For example, a so-called ICC (International Color Consortium) standard is known which serves as a platform for the conversion of color data. It is thereby an exemplary goal to convert the device specific color data into a device independent color space from which one can again transform into other device specific color spaces. A device independent color space can be used in an exemplary process as second color space.

With respect to the modeling process, the following information is provided based on the aforementioned EP Application No. 01 101 128.5-2202. The light modulation values mentioned in the above mentioned modeling process describe the light modulation by way of the light modulators and are preferably in direct relation to the image data. This relationship can be based on a modeling of the functional relationship between the image data input into the image reproduction system and the characteristic (modeled) physical properties of the image reproduction system. In particular, the light modulation value is a measure for how strongly a certain light modulator contributes to the overall light modulation. A light modulation value describes, for example, the strength of the pigment formation in the photographic paper and/or the concentration of the produced pigment. The light modulation value can also take into consideration the reflection property of the medium on which the pigment is found. In the modeling process, the light modulation values are calculated based on a model which models the answer of an image reproduction system to image data (image control data). For that reason, this model is also referred to as "model image reproduction system".

When the transformation positions and the model positions are determined, second positions in the second color space can be determined therefrom. These second positions can be determined in such a way that they include the advantages and/or properties of the transformation process and the modeling process. The second positions can then be output by an exemplary process or can serve as basis for a further processing. The further processing can include the second positions being transformed into image data (optimized image data). The transformed (optimized) image data can represent positions in a third color space. The third color space can be adapted to an output device, which is to be controlled by the processed image data (optimized image data).

The determination of the second positions can be carried out by a connection rule or mixing rule which connects or mixes the transformation positions with the model positions in order to obtain the second positions. In this connection or mixing, the first positions corresponding to the second positions and especially their location (for example defined by distances) in the first color space can be taken into consideration. The connecting role or mixing role is dependent on the position of the first positions in the first color space and/or on the position of the transformation positions, the model positions and/or second positions (in the second color space), which participate in the mixing or connection. This means that depending on the position (in the first and/or second color space) a different combination or mixing can take place. Depending on the position (in the first and/or second color space) the second position can, for example, completely correspond with a transformation position so that the corresponding model position was without influence during the mixing or the second position can completely correspond with a model position so that the corresponding transformation position was without influence during the mixing. Those transformation positions and model positions can be combined to second positions, which originate from the same image data (which means the corresponding first positions). Alternatively or additionally, for example, not only a model position and a transformation position which are obtained from the same first position can be combined, but, for example, also transformation positions or model positions originating from the first position locally adjacent in the image to the (corresponding) first position can flow into the combination rule or mixing rule for determination of a second position, for example at a decreasing weight with increasing distance from the first position.

It is an advantage of the process in accordance with an exemplary embodiment that properties of the output device which are represented by the model positions are combined with properties of the input device which are represented by the transformation positions in order to thereby find, for example, depending on the taste of the user, second positions which are considered an optimal starting point for image data (image control data). Thus, a direct assignment (correspondence) exists between the input image data (first positions) and the second positions so that each image datum is assigned a second position and, thus, the conversion of the image data into the second positions at least subjective. It can also be bijective in order to particularly design the process to be reversible.

The image data input into the process can be such that they stretch a certain value space. They are, for example, sRGB data with three value channels (R, G and B) the values of which can respectively run over a range of values of, for example, 0 to 255. The associated control value space is also three dimensional and the value range of each dimension runs from 0 to 255. The model image reproduction system can be adapted to the control value space of the input image data. The model image reproduction system can, for example, then be designed in such a way that upon input of all possible image data (which stretch the whole control value space) all or at least almost all of the color values reproducible by the model image reproduction system can be produced. For example, when the model image reproduction system models a printer (output device), which has an RGB input, the model image reproduction system can be designed such that the R, G and B channels are completely or at least almost completely controlled by the image data (of the input device) when all possible image data acceptable in the control value space are input. This can be simply achieved, for example, in that the sRGB data of the input device are interpreted as RGB data for the model image reproduction system (modeled output device) and the individual channels of the input device and the modeled output device have the same control value range or bit value depth (for example 0 to 255).

It can be guaranteed by the above mentioned design of the model image reproduction system which is adapted to the control value space of the (received image data) that the model positions can fully utilize the gamut of the model image reproduction system and also that the model image reproduction system can be fully modulated regarding its color reproduction possibilities.

This guarantees in contrast to the conventional processes that, for example, upon modeling of a photographic printer with photographic paper the dark colors which are not present in the sRGB color space can be described by the model positions. Thus, the gamut of the photographic paper can be better utilized.

As already discussed above, the modeling process leads to all possible model positions reflecting the gamut of the output device, while all possible transformation positions reflect the gamut of the input device. That part of the second color space which includes all possible transformation positions is referred to as "transformation portion". That portion of the second color space which includes all possible model positions is referred to as "model portion" of the second color space. If image data are now input into the process, which take on all possible values of a control value space, the transformation leads to stretching of the transformation portion in the second color space and the modeling leads to stretching of the model portion in the second color space. The transformation portion and the model portion normally respectively overlap, whereby that portion in which they overlap is referred to as "overlapping portion".

As already mentioned above, the combination or mixing of the model positions and the transformation positions can be carried out position dependent (i.e. particularly in dependence of the transformation position, the model position and/or the second position). This position dependence on the transformation can be based in accordance with exemplary embodiments of the invention on (precise) parts, for example subspaces, sections or points of the second color space, the transformation portion, the model portion and/or the overlapping portion. The position dependency is, for example, related to the gray axis, a section of the gray axis or a point on the gray axis. Further criteria, for example the shortest distance to the gamut edge (gamut boundary surface) upon defined metric can be alternatively or additionally used. If the first color space is sRGB, the second positions at or in the vicinity of the gray axis can be determined alone or essentially on the basis of the transformation positions. This can apply even for a significant or major part of the overlapping portion, for example for up to 10%, 30%, 60% or 80% of the (especially inner region of the) overlapping portion, whereby in the remaining regions, especially at the edge of the overlapping portion, the proportion of the model positions in the determination of the second position increases. This can be designed in such a way, for example, that upon a mathematical combination of the transformation positions and the model positions to obtain the second positions, the mathematical combination is carried out in a weighted manner and the weight for the model positions increases with the distance from the gray axis, while the weight for the transformation positions decreases with the distance from the gray axis.

Alternatively or additionally, the edge surfaces of the transformation portion can also be used as (precise) parts. For example, the weight of the transformation positions can decrease with decreasing distance from the next boundary surface of the transformation portion and the weight of the model positions increase, whereby the decrease and increase of the weights can be symmetrical.

The above mentioned distances can be determined in the first color space as will be shown later by way of an example.

In the central region of the overlapping portion or in the mainly inner region of the overlapping portion the transformation positions for the determination of the second position can be in a weighted mathematical combination more strongly weighted than the model positions in order to achieve a mathematically correct reproduction of the colors for the central region. The border region of the overlapping portion can be designed such that the color reproduction possibilities of the model image reproduction system are used. Thus, the model positions are there stronger reinforced or stronger weighted than the transformation positions during the determination of the second positions.

The influencing of the determination of the second position by the first positions, the transformation positions and/or the model positions can be continual. In particular, the position dependency of the determination of the second positions is continual or is described by a continual function. At least the first derivation of this function can be continual. The function can describe the combination of the second transformation positions and the model positions for the determination of the second positions. When first and second positions are herein described as corresponding to one another, this means that the second positions originate from the first positions by way of an exemplary process in accordance with the invention.

The combination, especially the mathematical combination, can be advantageously carried out such that position values which describe the positions of the first positions, the model positions and/or the transformation positions are especially mathematically combined. The first positions, model positions and/or transformation positions can be represented, for example, by coordinates in a three-dimensional space or by values which describe a vector.

The determination of the second positions based on the first positions, the transformation positions and/or the model positions can also be carried out in dependence of the image content or of colors, structures or patterns in parts of the image. For example, if text is recognized as image content by way of a pattern and/or character recognition process, the second positions can be determined alone or mainly on the basis of the model positions in order to achieve the best possible contrast during text reproduction. Alternatively or additionally, the weighting in favor of the model positions can be at least shifted depending on the image content. One can proceed accordingly when parts of the image relate to text or structured graphics which have a high local contrast. In this case, for example a shift of the weighting in favor of the model positions can then also be carried out locally in order to achieve, for example a best possible contrast effect.

Alternatively or additionally, the determination of the second positions based on the first positions, transformation positions and/or the model positions for different color properties (such as brightness or luminance, color saturation and hue) can be carried out differently. Correspondingly or alternatively, a processing of the position values of the transformation values and/or model positions depending on which (color) channel or which dimension in the color space they are associated with, can be carried out differently. For example, if the position in the second color space is described by a value triplet, one of the three values, for example, can relate to the (brightness position value), while a second value relates to the color saturation and a third value to the hue. This is the case, for example, for the Lab space. For each of the dimensions of the second color space, different combination rules can then apply for the transformation and model positions. For example, for brightness position values (coordinates) the combination can be carried out depending on corresponding brightness position values of the transformation positions and the model positions. The weighting can in this case can be carried out for example mainly or only in dependence of the distance of the brightness position values from the gray value axis or, for example, in dependence of the minimal distance of the transformation positions from the gray value axis.

Other position values (coordinates) of the transformation and/or model positions, which for example relate to the hue or the color saturation and which are in the following referred to as hue position values or color saturation position values, can be combined in another manner in order to determine a hue position value or color saturation value for the second positions. For example, the weighting can be carried out in this case in dependence of the distance to the next closest boundary surface of the transformation part.

The model image reproduction system can be an idealized model. This means that the idealized model image reproduction system can be designed such that it can reproduce all color values, which can be reproduced by any real image reproduction systems. Expressed differently, the gamut of the idealized model mage reproduction system can include all gamuts at the output of all real image reproduction systems, especially the gamut of all possibly considered output media. An idealized model image reproduction system is, for example, modulated in that no overexpression between the spectra of the colors occurs. This idealization achieves the advantage that although by the conversion of the image data into the model positions an approximation to a real image reproduction system is already achieved, no information is lost, which can be used later by the real image reproduction system. An ideal model image reproduction system can, for example, mirror the ideal properties of a certain type of image reproduction system, for example the ideal properties of a photographic printer or a picture printer. For example if the real system is a monitor, the ideal model image reproduction system, for example, mirrors the ideal properties of a monitor.

A targeted reduction of the gamut of the second positions can be carried out by a further transformation of the second positions into a third color space in order to achieve an optimal adaptation to the real image reproduction system. The gamut of a real image reproduction system can be smaller than the gamut of the ideal modeled image reproduction system. Thus, the color space covered by the model space can include the gamut of the real image reproduction system. In order to then achieve optimized image data, the second positions which lie outside the gamut of the real image reproduction system can be transformed, for example, to the next closest edge of the gamut (reproducible color space) of the real image reproduction system. Since the model positions already approximately (idealized) mirror the properties of the real image reproduction system and exert a significant influence during the determination of the second positions, especially the positions lying at the edge of the gamut, only minor distortions occur even upon this very simply designed transformation into the third color space mentioned only as exemplary, so that optimized image data can be obtained with respect to the parameters given by the real image reproduction system.

When reference is made in this application to adjacent or close with respect to color spaces, this refers to color distances as defined, for example, according to the CIE-Lab standard, which relates to the human color perception.

BRIEF DESCRIPTION OF THE DRAWINGS

Exemplary embodiments are described in the following. Further advantages and features are thereby disclosed.

DETAILED DESCRIPTION OF THE PREFERRED EMBODIMENTS

Figure 1:
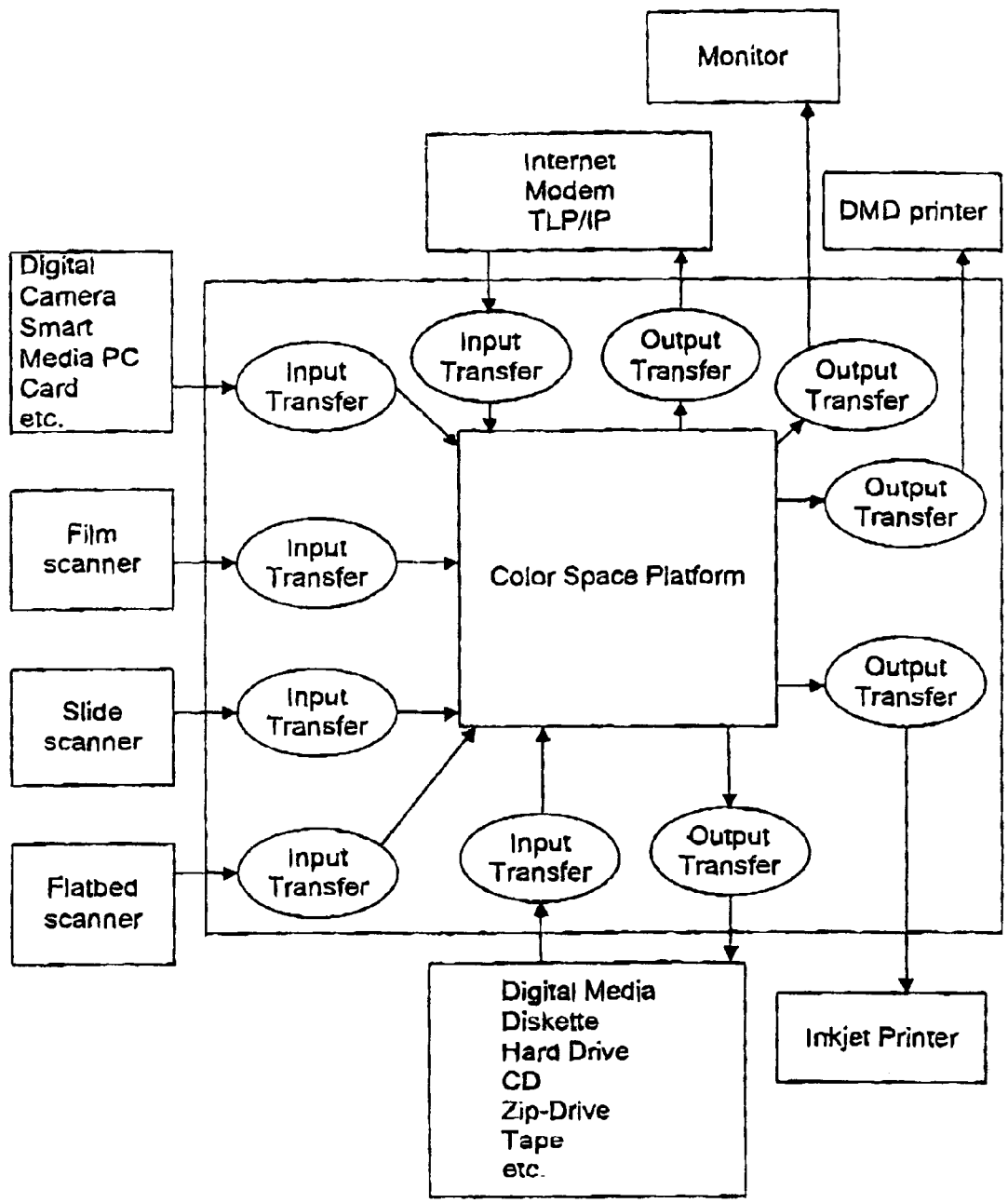
FIG. 1 shows the networking of a photographic lab in accordance with an exemplary embodiment of the invention or a photographic printer with input devices and output devices.

FIG. 1 shows a schematic view of a color management wherein an exemplary process in accordance with the invention is used. In the color management, a desired color space or standard space serves in the middle as common platform (second color space). The CIE-Lab color space is preferably selected as standard space (second color space). It has desired properties, namely it is independent of the type of pigments system (for example printer with paper), which operates with an image reproduction device, pigments and a medium, and covers the spaces of all possible pigment systems. The color data reproduced in the color space of a specific image are not completely independent from the type of devices which were used during the capture and digitalization of the image information (for example camera, film scanner), since the details of an image reproduced in this color space disclose the hue range or gamut of these input devices and since different input devices typically cut or distort different parts of the color space. However, as an exemplary property, the second color space can be designed so that each color has its own and well defined position or takes up a unique region in the color space. Further defined transformations can exist between the second color space and the different input or output devices. Output devices are, for example, pigment systems, monitors, digital storage media or network interfaces.

The CIELAB color space can be selected as the second color space which has the following advantages, or a color space with the same or similar advantages.

The CIELAB color space is adapted to the color sensitivity of the human eye. In the Lab color space, each color pair which is separated by a euclidic distance I appears for a human observer to be equally spaced apart. An average observer is further able to distinguish colors up to about $\Delta E=[(\Delta L^2+\Delta a^2+\Delta b^2)]^{1/2}=1$. The brightness L is separate from the chromatic information (hue and saturation). The radius $[(a^2+b^2)]^{1/2}$ in the (a, b)-plane is a measure for the color saturation. In the (a, b)-plane, the angle with the a-axis is a measure for the hue.

It is a further advantage of the CIE-Lab color space that it is not limited to a certain hue range or gamut. This is, for example, a difference to the sRGB color space except if one also allows negative sRGB values.

The information processing by way of the model image reproduction system of a scanner or a digital camera, which outputs RGB image data, which are normally declared as sRGB image data, to CIELAB values is described in the following by way of example and by way of FIG. 2. The image reproduction system for which the image data are to be optimized is, for example, a printer with photographic paper.

The printer can be for example, a DMD-printer in which light from a light source is projected onto light sensitive photographic paper (for example silver halogenide photographic paper). The DMD is a field with many small mirrors which can be respectively flipped by a certain angle. The DMD field is used in order to expose the paper pixel by pixel with a certain light amount. Different color filters are used to produce exposure light of different color (for example red, green and blue). The colors red, green and blue then lead on the light sensitive paper to the primary colors cyan, magenta and yellow.

The data stream from the scanner or the digital camera up to the CIE-Lab color space according to the modeling system is discussed in the following by way of FIG. 2. Sub-optimal sRGB-data, for example, of the digital camera are transformed into optimized sRGB data in a step 0, for example, with the help of an image dependent optimization process. This optimization is optional. Subsequently, the sRGB data are, for example, channel by channel recalculated into pigment concentrations Ci in a step 1. The following calibration property can be a prerequisite, for example: the concentration Ci is determined with the help of a function F which models the model image reproduction system for a preselected channel control value Di (with i=sR, sG, sV; the red channel is also, for example, a $d_{sR}$=sR). The function f models the reaction of the model image reproduction system to the input of the image control data sRGB. The pigment concentrations Ci provide examples for light modulation values which result upon the input of the image control data (sRGB) into the model image reproduction system. For example, if an inkjet printer is used or if photographic paper is exposed, Ci represents the pigment concentration of the color i which is produced by the spraying of a certain amount of pigment from a jet reaction to a channel control value $D_i$. The function F modulates also the production of the light modulation values (pigment concentrations). However, the color value which is produced upon input of the image control data into the model image reproduction system is thereby not yet modeled. The step 2 illustrated in FIG. 2 is therefore necessary which models the measurable or observable color value at preselected light impingement conditions and observation conditions. This takes place in the following step 2 of the modeling process.

Thus, in the following step 2 of the modeling process CIE-Lab values (modulation color values) based on the pigment concentrations are predicted in the end. Additionally or alternatively, paper densities CMY can also be calculated as they would be measured by a densitometer.

Figure 2:
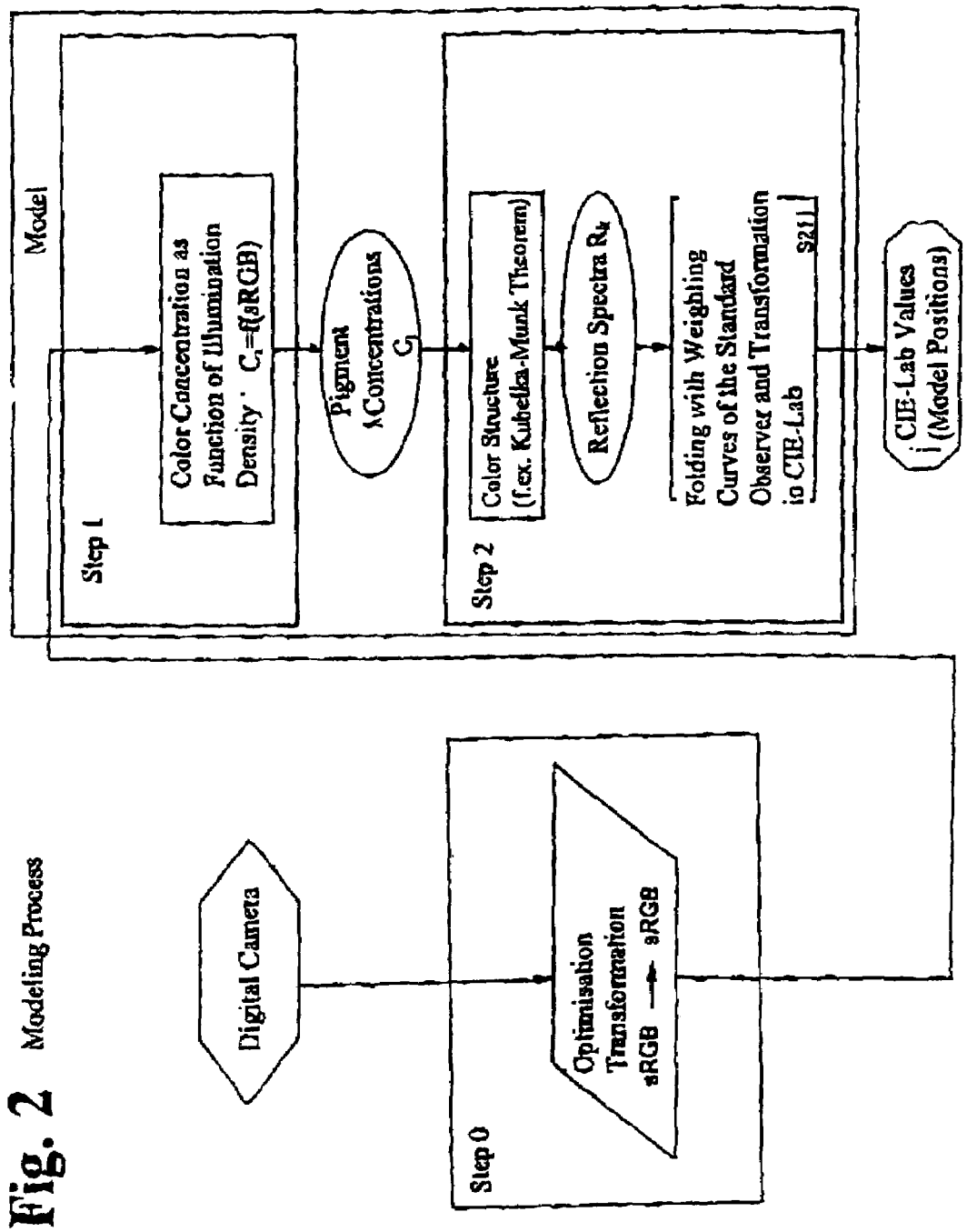
FIG. 2 shows an exemplary modeling process according to the European Patent Application No. 01 101 128.5-2202.
Figure 3:
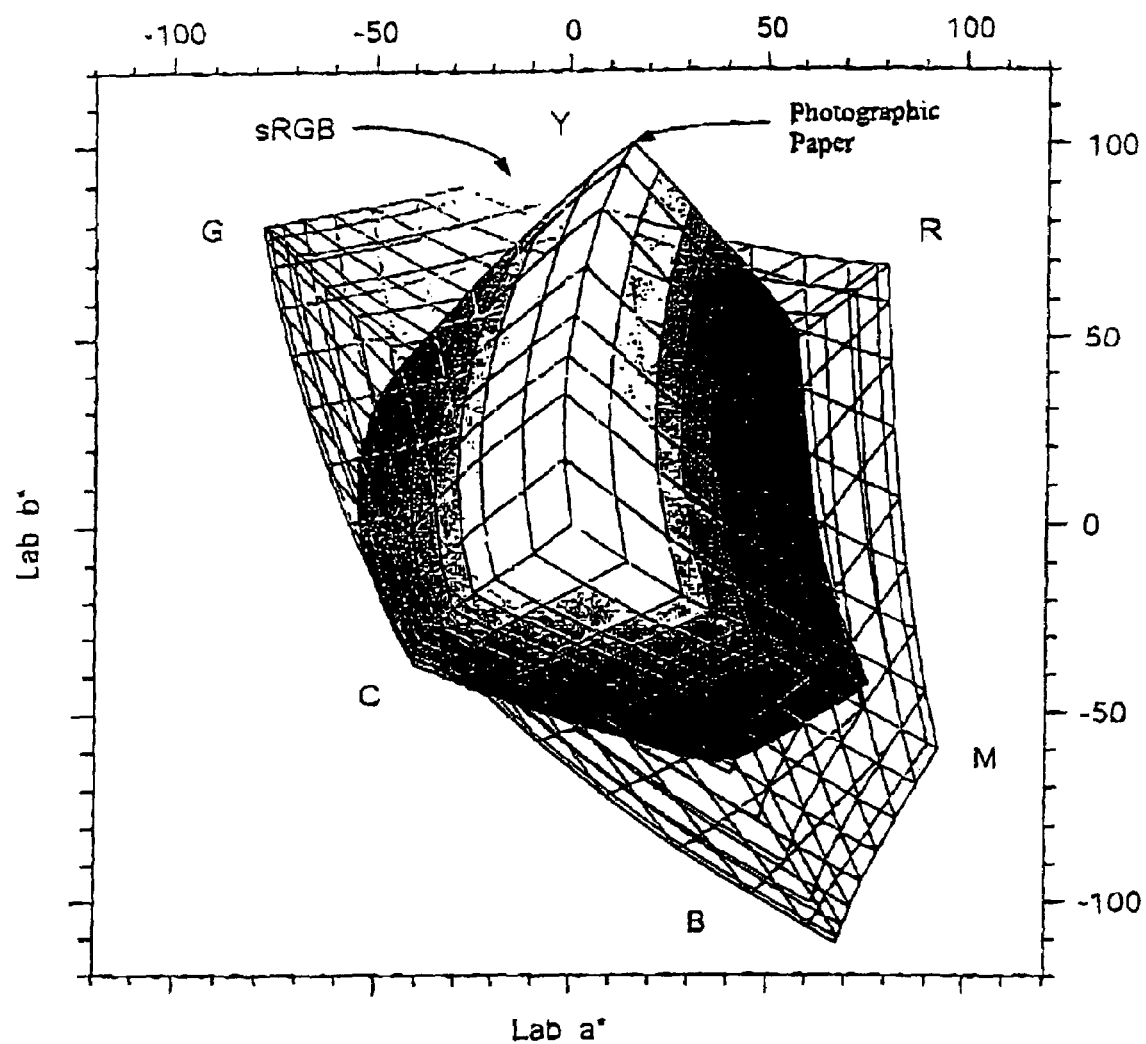
FIG. 3 shows an example of a second color space with a transformation portion referred to as sRGB and a model portion referred to as photographic paper.

The step 2 shown in FIG. 2 is described in the following. The color concentrations describe the light reflection properties of the pigments produced. With this set of n color concentrations Ci a resulting reflection spectrum $R(\lambda)d\lambda$ is derived, whereby the Kubelka-Munk approach with a single constant and with a simplified Saunderson Correction is used. This theory is described in Kang, H. R. (1997a), 2.6 Kubelka-Mulk Theory, in: Color Technology for Electronic Imaging Devices, SPIE Optical Engineering Press (Washington, U.S.A.), pages 48-54. The model of Kubelka-Munk represents only one possible realization. A further possibility is, for example, a simple model in which a linear connection is produced between spectral color concentrations and spectral color densities. The model can also be expanded with the Kubelka-Munk approach, for example, to a 3 color layer model. At the end of the second step, the reflection spectrum $R(\lambda)d\lambda$ is finally weighted with the relative spectrum of the illumination source, for example ($D_{65}$, 2°) and folded with color tuning functions of the CIE-XYZ space. The resulting CIE-XYZ triplet is converted into Lab values, whereby the standard formula and the right point of the paper or the medium is used. Further properties, especially of the medium, can be taken into consideration which influence the appearance picture especially within the framework of the step 2, such as, for example, whether the medium is glossy or matte. Correspondingly, different reflection spectra, for example, or model parameters can be selected.

The model calculates the resulting Lab values which reproduce the second positions in the second color space for a mixture of n pigments. One thereby distinguishes between printer-RGB-input data and pigment concentrations $C_i$. All values are normalized to 1 and lie in the interval [0, 1]. The index i goes from 1 to n.

ANSI-status-A-paper densities or other color density values which would be measured by a photo densitometer can be calculated from the spectral reflection spectra and namely by folding with the corresponding color tuning functions.

With respect to further details of the modeling process, reference is made to the European Patent Application No. 01 101 128.5-2202.

The above described modeling process only represents one example. Other model image reproduction systems, such as for example, inkjet printers or also monitors can also be correspondingly used as the basis for the modeling process.

The transformation of the first positions into the second color space to obtain the transformation positions will now be described in the following.

This transformation is advantageously described by a mathematical expression which carries out, for example, a transformation from the sRGB color space into the second color space. For example, a standard formula can be used for the transformation from sRGB into CIE-Lab. The sRGB coordinates are thereby preferably first transformed into CIEXYZ coordinates in that the definition of the standard sRGB color space is used. Subsequently, the CIEXYZ coordinates are converted into CIE-Lab values with a $D_{50}$ illumination.

In a value range of 0 . . . 255 for RGB values, the gamma function is taken into consideration as follows:

When $R/255/G/255/B/255<0.00304$ $255*R'=12.92*(R/255)$ $255*G'=12.92*(G/255)$ $255*B'=12.92*(B/255)$ otherwise $255*R'=1.055*(R/255)^{1/2.4}-0.055$ $255*G'=1.055*(G/255)^{1/2.4}-0.055$ $255*B'=1.055*(B/255)^{1/2.4}-0.055$ XYZ coordinates are thus, for example, obtained as follows from the sRGB coordinates according to the above mentioned publication of Mary Nielson and Michael Stokes:

$X=0.4361 \cdot R'+0.3851 \cdot G'+0.1431 \cdot B'$;

$Y=0.2225 \cdot R'+0.7169 \cdot G'+0.0606 \cdot B'$;

$Z=0.0139 \cdot R'+0.0971 \cdot G'+0.7141 \cdot B'$;

The above obtained XYZ-coordinates can represent the position values for the second positions. However, they can be transformed into the CIE-Lab space. How this is to be done is described, for example, in the above mentioned publication E. J. Giorgianni & T. E. Maddon. The CIE-Lab values L, a and b are calculated as follows from X, Y and Z (tristimulus values), whereby $X_a$, $Y_a$ and $Z_a$ describe the tristimulus values of the associated reference-white:

$$L = 116\left(\frac{Y}{Y_n}\right)^{(1/3)} - 16 \quad \text{for } \frac{Y}{Y_n} > 0.008856$$

$$L = 903.3\left(\frac{Y}{Y_n}\right) \quad \text{for } \frac{Y}{Y_n} \geq 0.008856$$

and $$a = 500\left[f\left(\frac{X}{X_n}\right) - f\left(\frac{Y}{Y_n}\right)\right]$$

(A4)

$$b = 200\left[f\left(\frac{Y}{Y}\right) - f\left(\frac{Z}{Z}\right)\right]$$

whereby $$f\left(\frac{X}{X_n}\right) = \left(\frac{X}{X_n}\right)^{(1/3)} \quad \text{for } \frac{X}{X_n} > 0.008856$$

$$f\left(\frac{X}{X_n}\right) = 7.787\left(\frac{X}{X_n}\right) + \left(\frac{16}{116}\right) \quad \text{for } \frac{X}{X_n} \leq 0.008856$$

$$f\left(\frac{Y}{Y_n}\right) = \left(\frac{Y}{Y_n}\right)^{(1/3)} \quad \text{for } \frac{Y}{Y_n} > 0.008856$$

$$f\left(\frac{Y}{Y_n}\right) = 7.787\left(\frac{Y}{Y_n}\right) + \left(\frac{16}{116}\right) \quad \text{for } \frac{Y}{Y_n} \leq 0.008856$$

$$f\left(\frac{Z}{Z_n}\right) = \left(\frac{Z}{Z_n}\right)^{(1/3)} \quad \text{for } \frac{Z}{Z_n} > 0.008856$$

$$f\left(\frac{Z}{Z_n}\right) = 7.787\left(\frac{Z}{Z_n}\right) + \left(\frac{16}{116}\right) \quad \text{for } \frac{Z}{Z_n} \leq 0.008856$$

Since the modeling process can also use analytical functions, it results that the mathematical generation of the transformation positions and the model positions can be described by analytical functions. Expressed otherwise, the mixing or combining can use only analytical functions. In particular, the determination of the second positions from the image data based on the transformation positions and model positions can be carried out with one single (mathematically summarized) transformation.

The transformations used can accordingly be parameterized. It is thereby possible to shape their behavior as desired. Interpolation algorithms are thereby not required but can be used if desired. This is very helpful for the gamut mapping required for the mixing because an exact knowledge of the gamut boundaries can be advantageous in order to avoid numerical instabilities in the vicinity of the gamut boundaries.

Different, mutually competing color management expectations are combined by an exemplary process and brought into alignment. Simultaneously, disadvantages of the different processes according to the prior art are avoided. At the input, the scientifically correct transformation of sRGB to the respective PCS coordinates (for example CIE-Lab) can be used for a significant part or the majority of the color space, for example up 10%, 30%, 60% or 90% of the color space (for example the inner region of the overlapping portion). The color space can be only in the vicinity of strongly saturated colors "bent" in direction to the paper color. With this compromise, the expectation of the user can be fulfilled that graphic images or text which are added to the photographic images can be printed with saturated paper colors, while the remaining part of the image is printed preferably with the use of standard color management solution.

Exemplary advantages of the process described in the introduction under point 3 can be copied by the modeling process with use of an idealized model (for example no color overexpression). However, a larger flexibility with changing output devices can be achieved by the use of the idealized model in contrast to the process according to point 3.

With the above described modeling process, CIE-Lab values can also be obtained at a certain illumination (for example $D_{50}$-illumination). With the above described transformation of sRGB into the CIE-Lab color space in which the color values are preferably maintained, CIE-Lab values can also obtained at the same illumination, thus for example $D_{50}$-illumination.

In order to carry out the above described mixing or combination of the model positions and transformation positions, one can proceed as follows.

The sRGB coordinates can be normalized to a value range of 0 to 1. Two distances in the metric of the sRGB cube can then be determined:

The distance of an sRGB image datum (first position) to the closest sRGB-edge surface is $\Delta_{surface}$ (also called "sRGB surface"). The minimal distance of $\Delta_{surface}=0$ is achieved at the sRGB edge surface. For a point with sRGB coordinates (0.5, 0.5, 0.5), the minimal distance is $\Delta_{surface}=0.5$, whereby this point has to maximum distance to the sRGB edge surface out of all sRGB points.

The distance of the same sRGB image datum (the same first position) to the gray axis is referred to as $\Delta_{gray}$. For points on the gray axis, it resolves $\Delta_{gray}=0$. For corners of the sRGB cube, a value of $\Delta_{gray}=(2/3)^{1/2}$ results, apart from black and white.

Weighting factors $W_{surface}$ and $W_{gray}$ for the sRGB image datum are determined as follows for the mixing or combination:

$$W_{gray}=1-\exp(-\Delta_{gray}/\sigma_{gray})$$

$$W_{surface}=m[\exp(-(\Delta_{surface}-d)^2/\sigma_{surface})-\exp(-(0.5-d)^2/\sigma_{surface})]$$

In the above equation, m, d, $\sigma_{surface}$ and $\sigma_{gray}$ define constants. If $(L_1, a_1, b_1)$ defines the Lab value which results from the transformation of the sRGB image datum (first position in the first color space) into the Lab color space and thus defines a transformation position and $(L_2, a_2, b_2)$ defines a model position which results by way of the modeling process from the sRGB image datum (first position), a (L, a, b)-value which defines a second position corresponding to the first position can be determined, for example, as follows:

$$L=(1-W_{gray})L_1+W_{gray}L_2$$

$$a=(1-W_{surface})a_1+W_{surface}a_2$$

$$b=(1-W_{surface})b_1+W_{surface}b_2$$

In the above combining process, the respectively corresponding channels of the model positions and the transformation positions, i.e. the L-channel, the a-channel and the b-channel are therefore combined with one another. The L-channel regarding the brightness is determined in dependence of a distance from the gray axis. For the other two channels, the weighting is carried out in dependence of the distance from the gamut plane of the normalized RGB cube. Normally, a model position with coordinates in the second color space which are different from the coordinates of the corresponding transformation position results from a first position (of an sRGB image datum) by way of the modeling process. For the calculation of $\Delta_{surface}$ and $\Delta_{gray}$ and thereby of $W_{gray}$ and $W_{plane}$ at least one of the two possible, normally different coordinates can be used alternatively or additionally to the above described process, whereby the determination of the distances then does not take place in the first color space (as RGB) but in the second color space (Lab).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced herein.

We claim:

1. A process for the processing of image data which represent color values of an image, to achieve reproduction of the image by an image reproduction system, comprising:
   a) receiving the image data which represent first positions in a first color space;
   b) transforming the first positions into transformation positions in a second color space;
   inputting the image data which represent first positions in the first color space as image control data into a model image representation system and modeling with a model image reproduction system a response of the image reproduction system to the image data such that the model image reproduction system outputs the response as model positions wherein the model positions are in a second color space represent the color values produced by the model image reproduction system in response to the input of the image data; and
   c) determining second positions in the second color space based on the transformation positions and the model positions to determine optimized image data for the control of the image reproduction system, wherein the determined second positions are a combination of the transformation positions and the model positions.

2. The process according to claim 1, wherein the image data can take on control values in a predetermined control value space, and the model image reproduction system produces second model positions in response to all possible control values of the control value space which represent the color values which approximately spread the portion of the second color space reproducible by the model image reproduction system or at least encompass that portion.

3. The process according to claim 1, wherein the image data can take on control values in a preselected control value space and when all control values of the control value space are subjected to step b), the transformation positions spread a transformation portion of the second color space and the model positions spread a model portion of the second color space, wherein the transformation portion and the model portion overlap in an overlapping portion of the second color space, and wherein:
   i) the determination of the second positions is more strongly influenced by the transformation positions than by the model positions when the second positions are closer to a gray value axis of the overlapping portion and/or when first positions corresponding to the second positions are closer to a gray value plane of a part of the first color space spreadable by the received image data; and/or
   ii) the determination of the second positions is more strongly influenced by the model positions than by the transformation positions when the second positions are located at an edge of the overlapping portion and/or when first positions corresponding to the second positions are closer to an edge of the first color space spreadable by the received image data; and/or
   iii) the determination of the second positions is more strongly influenced by the transformation positions than by the model positions when the second positions are closer to a center of the overlapping portion and/or when first positions corresponding to the second positions are closer to a center of the first color space spreadable by the received image data.

4. The process according to claim 3, wherein influencing of the determination of the second positions by the transformation positions and by the model positions is carried out such that the color values described by the second positions are a continual function of the image control data.

5. The process according to claim 4, wherein for a mathematical combination of position values of the second positions which describe brightness are determined from the corresponding position values of the transformation positions and the model positions by way of a weighting, wherein this first weighting is carried out depending on a location of the corresponding first positions and/or transformation positions and/or model positions relative to a gray value axis or to one or more points on the gray value axis; and/or wherein for a mathematical combination of those position values of the second positions which describe hue and/or color saturation are determined from the corresponding position values of the transformation positions and the model positions by way of a second weighting, wherein this second weighting is carried out depending on a location of the corresponding first positions, transformation positions and/or model positions relative to a next closest boundary surface or boundary of the portion of the respective color space respectively spreadable by the respective positions.

6. The process as defined in claim 1, wherein for the determination of the second positions position values are combined which describe the positions of the model positions and transformation positions in the second color space.

7. The process according to claim 6, wherein for the determination of the second positions, position values of such model positions and transformation positions are respectively combined which result from a same image control value to assign a second position to each image control value.

8. The process according to claim 1, wherein the first color space is a device dependent color space, and the second color space is a device independent color space, wherein the model image reproduction system represents an idealized model of the image reproduction system, and the second positions are transformed into third positions which represent color values in a third color space which mirrors the color space of the image reproduction system, wherein the image reproduction system is a non-idealized image reproduction system.

9. The process according to claim 8, wherein the first color space is an RGB color space, and the second color space is a CIE-LAB color space or CIEXYZ color space.

10. A computer readable medium storing a program which when loaded on or running on a computer initiates the computer to carry out the process according to claim 1.

11. A photographic printer or photolab, comprising: a unit for receiving image data; a data processing unit for processing the received image data according to the process of claim 1 to optimize the image data; and an image recording system for producing a photographic image based on the optimized image data on a recording medium.

12. The photographic printer or photolab of claim 11, wherein the medium is paper or photographic paper.

13. A process for the processing of image data which represent color values of an image, to achieve reproduction of the image by an image reproduction system, comprising:
   a) receiving the image data which represent first positions in a first color space;
   b) transforming the first positions into transformation positions which represent positions in a second color space; and modeling with a model image reproduction system a response of the image reproduction system to the image data such that the model image reproduction system outputs the response as model positions which represent the color values produced by the model image reproduction system in response to the input of the image data as positions in a second color space; and
   c) determining second positions in the second color space based on the transformation positions and the model positions to determine optimized image data for the control of the image reproduction system;
   wherein the image data can take on control values in a preselected control value space and when all control values of the control value space are subjected to step b), the transformation positions spread a transformation portion of the second color space and the model positions spread a model portion of the second color space, wherein the transformation portion and the model portion overlap in an overlapping portion of the second color space, and wherein:
      i) the determination of the second positions is more strongly influenced by the transformation positions than by the model positions when the second positions are closer to a gray value axis of the overlapping portion and/or when first positions corresponding to the second positions are closer to a gray value plane of a part of the first color space spreadable by the received image data; and/or
      ii) the determination of the second positions is more strongly influenced by the model positions than by the transformation positions when the second positions are located at an edge of the overlapping portion and/or when first positions corresponding to the second positions are closer to an edge of the first color space spreadable by the received image data; and/or
      iii) the determination of the second positions is more strongly influenced by the transformation positions than by the model positions when the second positions are closer to a center of the overlapping portion and/or when first positions corresponding to the second positions are closer to a center of the first color space spreadable by the received image data;
   wherein influencing of the determination of the second positions by the transformation positions and by the model positions is carried out such that the color values described by the second positions are a continual function of the image control data; and
   wherein for a mathematical combination of position values of the second positions which describe brightness are determined from the corresponding position values of the transformation positions and the model positions by way of a weighting, wherein this first weighting is carried out depending on a location of the corresponding first positions and/or transformation positions and/or model positions relative to a gray value axis or to one or more points on the gray value axis; and/or wherein for a mathematical combination of those position values of the second positions which describe hue and/or color saturation are determined from the corresponding position values of the transformation positions and the model positions by way of a second weighting, wherein this second weighting is carried out depending on a location of the corresponding first positions, transformation positions and/or model positions relative to a next closest boundary surface or boundary of the portion of the respective color space respectively spreadable by the respective positions.

* * * * *